3,162,688
PRODUCING NONCORROSIVE MERCAPTAN PRODUCT

Thomas A. Thigpen, Jr., and James K. Warkentin, Phillips, Tex., assignors to Phillips Petroleum Company, a corporation of Delaware
No Drawing. Filed Oct. 3, 1961, Ser. No. 142,477
9 Claims. (Cl. 260—609)

This invention relates to the production of a non-corrosive mercaptan product. In one of its aspects, the invention relates to the removal or preventing of formation of mercapto-metallic salt precipitates in mercaptans by mixing the mercaptan with a strong concentrated mineral acid, for example, sulfuric acid, to dehydrate the mercaptan and to lower the pH thereof to about 1. In another of its aspects, the invention relates to a stabilized or a purified mercaptan product which will be noncorrosive to vessels and equipment.

We have now found that the addition of a strong mineral acid such as sulfuric acid to a mercaptan will cause the appearance of two phases. A light phase which forms will contain the mercaptan, and the heavy phase which forms will contain acid impurities, water, etc., and can be separated by decanting, centrifuging, settling, filtering, or any other separation method. We have further found that the clear treated mercaptan so evolved is not corrosive to mild steel containers even though the pH, as tested with pHydrion 1-12 test paper, is 1 and the mercaptan is stored over long periods of time.

It is an object of this invention to produce a better mercaptan product. It is another object of this invention to produce a purified mercaptan product. It is a further object of this invention to produce a substantially non-corrosive mercaptan product. It is a further object of the invention to remove precipitates of mercapto-metallic salts from mercaptans. It is a still further object of this invention to produce a stabilized mercaptan product noncorrosive to mild steel.

Other aspects, objects, and the several advantages of the invention are apparent from a study of this disclosure and the appended claims.

According to the present invention, mercaptans are treated to remove or to prevent the formation of precipitates of mercapto-metallic salts by vigorously mixing the mercaptan with a strong concentrated mineral acid. In one embodiment of the invention, and by way of example thereof, ethyl mercaptan was treated with concentrated sulfuric acid to a pH of 1, eliminating green flocculent precipitate which had formed therein. After treatment the phases thus formed were separated.

In general, purity, per se, of the mercaptan is no indication of whether floc will form in the mercaptan. Thus, floc has been caused to form in Bureau of Standards ethyl mercaptan which is certified to be 99.95 percent pure. However, by treatment according to the invention this ethyl mercaptan no longer forms the floc.

Although not limited thereto, it now appears from tests that the green precipitate which forms is a ferrous ($Fe^{++}$) mercaptide. This compound seems to result from a rather complex reaction and seems to require the presence of a small hydroxide ion concentration in one of the intermediate steps before it will form. The treatment according to the present invention eliminates this small hydroxide ion concentration.

In addition to sulfuric acid other strong acids can be used. Hydrochloric acid has been used. Results similar but not now as preferred as those obtained with sulfuric acid were obtained.

One skilled in the art, having in possession this disclosure, having studied same, will recognize that the invention has at least the following advantages:

(1) Mercaptide precipitates already formed in the mercaptan will be removed;
(2) So long as residual pH of the mercaptan is near 1, no mercapto-metallic precipitates will form;
(3) The resulting mercaptan is noncorrosive to mild steel, as determined by tests.

This is believed to be due to the natural inhibiting characteristics of mercaptans on steel in acid solution. This natural inhibiting characteristic is enhanced by the treatment of this invention which removes impurities, as already noted.

The process of the invention for removing mercaptides from mercaptans is applicable to all mercaptans which form insoluble mercaptides. Thus, representative samples of alkyl primary, secondary, and tertiary mercaptans including ethyl through $C_{16}$ mercaptan were tested. The process was found applicable to the tested mercaptans.

Strong mineral acids, other than oxidizing acids, can be used in the treatment, as already noted. The treating reaction is rather quickly completed and, therefore, time and temperature of the reaction ordinarily are not critical. However, enough stirring for intimate mixing of the acid and mercaptan should be employed.

Reasonable variation and modification are possible within the scope of the foregoing disclosure and the appended claims to this invention, the essence of which is that a new mercaptan product has been obtained by treatment thereof with a strong mineral acid to remove from said product mercapto-metallic mercaptides and other impurities, as described.

We claim:

1. A method of purification comprising providing an alkyl mercaptan having up to a total of 16 carbon atoms and which will, upon storage, form a mercapto-metallic precipitate, treating said mercaptan with a non-oxidizing, strong, concentrated mineral acid to dehydrate said mercaptan, reduce the pH thereof to about 1 and form an acid phase and a mercaptan phase to thereby remove said mercapto-metallic precipitate and recovering the purified mercaptan.

2. A method according to claim 1 wherein said acid is selected from the group consisting of sulfuric and hydrochloric acids.

3. A method according to claim 2 wherein said mercaptan is ethyl mercaptan.

4. A method according to claim 1 wherein said acid is sulfuric acid and said mercaptan is ethyl mercaptan.

5. A method of purification comprising providing an alkyl mercaptan having up to a total of 16 carbon atoms and which will, upon storage, form a mercapto-metallic precipitate, treating said mercaptan with a non-oxidizing, strong, concentrated mineral acid to dehydrate said mercaptan, reduce the pH thereof to about 1 and form an acid phase and a mercaptan phase and thereby prevent the formation of said mercapto-metallic precipitate.

6. A method according to claim 5 wherein said acid is selected from the group consisting of sulfuric and hydrochloric acids.

7. A method according to claim 6 wherein said mercaptan is ethyl mercaptan.

8. A method according to claim 5 wherein said acid is sulfuric acid and said mercaptan is ethyl mercaptan.

9. A method of purification comprising providing an alkyl mercaptan having up to a total of 16 carbon atoms and which will, upon storage, form a mercapto-metallic precipitate, treating said mercaptan with a non-oxidizing, strong, concentrated mineral acid to dehydrate said mercaptan, reduce the pH thereof to about 1 and form an acid phase and a mercaptan phase to thereby remove said mercapto-metallic precipitate and prevent the formation of more of said mercapto-metallic precipitate and recovering the purified mercaptan.

References Cited in the file of this patent

UNITED STATES PATENTS

| | | |
|---|---|---|
| 2,009,554 | Lacomble | July 30, 1935 |
| 2,013,203 | Davis et al. | Sept. 3, 1935 |
| 2,236,928 | Thomas et al. | Apr. 1, 1941 |
| 2,525,153 | McClennan et al. | Oct. 10, 1950 |
| 2,581,493 | Lyon et al. | Jan. 8, 1952 |